Sept. 22, 1970 L. L. MAISSEL ET AL 3,530,055
FORMATION OF LAYERS OF SOLIDS ON SUBSTRATES
Filed Aug. 26, 1968
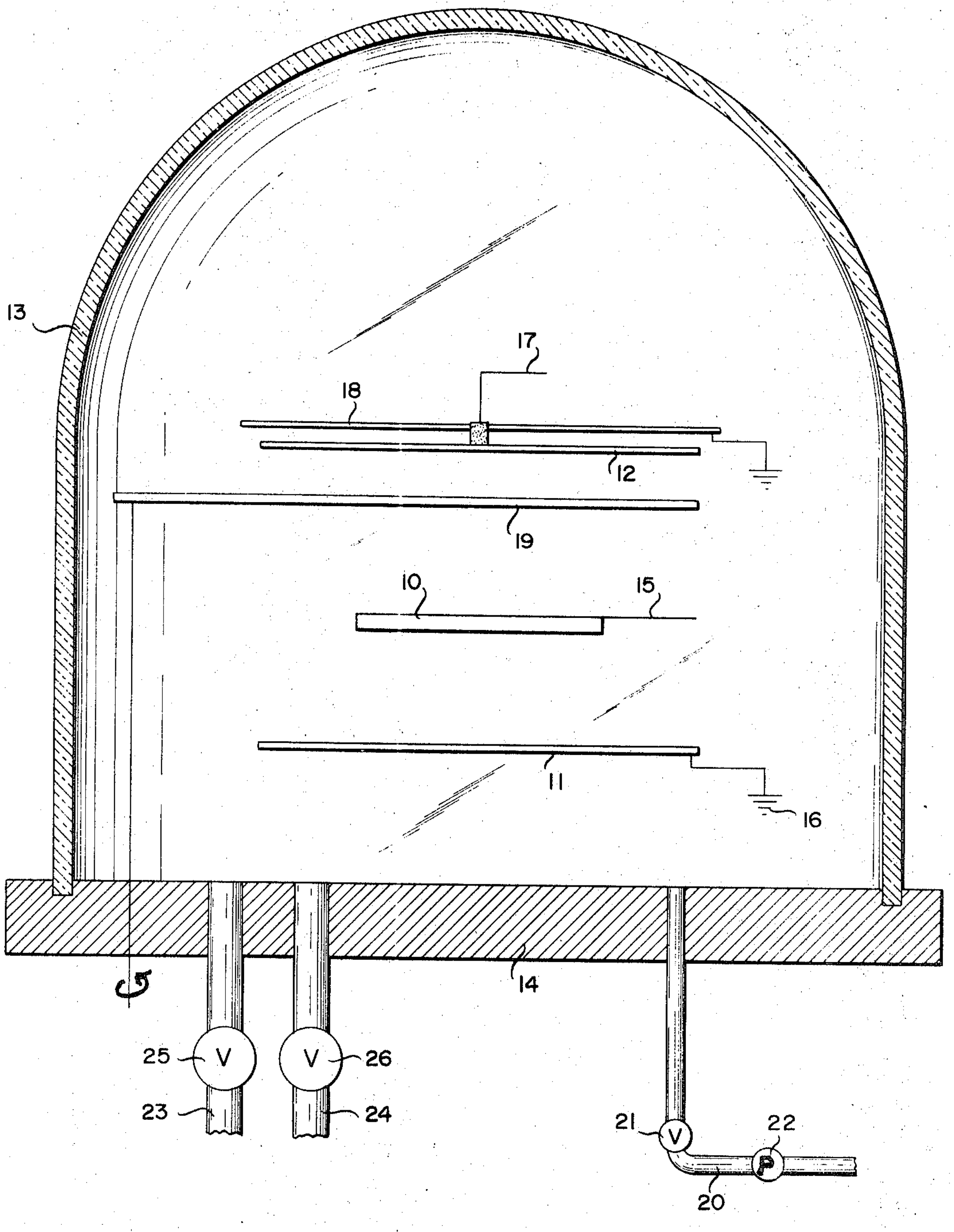
INVENTORS
Leon I. Maissel
Paul M. Schaible
BY Carroll B. Quaintance
ATTORNEY United States Patent Office 3,530,055
Patented Sept. 22, 1970

3,530,055

FORMATION OF LAYERS OF SOLIDS ON SUBSTRATES

Leon I. Maissel and Paul M. Schaible, Poughkeepsie, N.Y., assignors to International Business Machines Corporation, Armonk, N.Y., a corporation of New York Continuation-in-part of application Ser. No. 585,208, Oct. 7, 1966. This application Aug. 26, 1968, Ser. No. 756,081
Int. Cl. C23c *15/00*
U.S. Cl. 204—192 2 Claims

ABSTRACT OF THE DISCLOSURE

Sputtering metal from a cathode and first depositing films of metal and oxygen gas components, and subsequently depositing pure metallic films by imposing a relatively small positive bias with respect to an anode at the surface of a substrate and then by imposing a relatively large negative bias on the substrate while continuously sputtering metal from a cathode to the substrate, are described herein.

PRIORITY OF THE APPLICATION

This is a continuation-in-part of abandoned application Ser. No. 585,208 filed Oct. 7, 1966 and of abandoned application Ser. No. 334,857 filed Dec. 31, 1963, both applications being entitled Formation of Layers of Solids on Substrates being filed by Leon I. Maissel and Paul M. Schaible.

SUMMARY OF THE INVENTION

The present invention generally relates to a method for effecting the growth of solid layers on substrates. More particularly, it relates to a new and improved method for growing layers of solids on substrates by sputtering.

Heretofore in the deposition of a solid layer on a substrate or base by cathodic sputtering, frequently it has been difficult to obtain optimum adhesion of the layer to the substrate. Films with better adhesion are obtainable if an impurity is provided in the sputtering atmosphere, but better adhesion is achieved at the expense of the purity of the films.

It is the principal object of this invention, in the practice of a cathodic sputtering process, to obtain a stronger bond between a solid layer to be deposited on a substrate than takes place by direct contact between the layer and the substrate.

It is an important object of this invention, in a cathodic sputtering process, to grow a coating upon a substrate which will adhere strongly both to the substrate and to a subsequently grown overlayer of great purity.

It is a special object of this invention to grow a strongly adherent and uncontaminated layer of a normally solid material over a crystallographically incompatible substrate by ion and/or electron bombardment of a depositor of the material.

It is a particular object of this invention to deposit a strongly adherent and high purity tantalum layer over glass, or glass-like substrates.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 1 is a schematic representation of the essentials of one type of apparatus which may be utilized to practice a preferred embodiment of the herein disclosed invention.

DETAILED DESCRIPTION

Referring more particularly to the drawings, FIG. 1 diagrammatically illustrates a cathodic sputtering apparatus useful for carrying out the present invention. In connection therewith, the substrate 10, an anode 11 and a cathode 12 are suitably positioned in a vessel or bell jar 13. The bell jar 13 rests on a plate 14 which is capable of making a gas tight seal with the edge of the bell jar. Conductor leads 15, 16 and 17 are attached to substrate 10, anode 11, and cathode 12, respectively. A conventional cathode shield 18 is suitably mounted above the cathode 12 so as to confine the glow discharge to the lower portions of the bell jar 13. Similarly, a shutter 19, made of a suitable material, is positioned below the cathode 12 to effect the cleaning of the depositing material in case it is contaminated by exposure to atmosphere, etc. The plate 14 has a conduit 20 opening onto it. The conduit 20 leads to a valve 21 and vacuum pump 22. Two other conduits 23 and 24 open into the apparatus. The conduits 23 and 24 are used to admit an inert gas and a reactive gas, respectively, when desired into the apparatus. Two needle valves 25 and 26 in conduits 23 and 24, respectively, are provided to regulate the supply of these gases into the apparatus.

In accordance with the present invention, a sputtering atmosphere is provided having an inert gas containing about one-half percent of a reactive gas which is compatible with the nature of the substrate being used. By applying a conventional negative sputtering voltage, for example 3,000 volts, to the cathode, glow is initiated, and sputtering begins. The film is given a positive bias of 3 to 5 volts. After about 30 seconds to one minute, the source of the reactive gas is shut off while the substantially pure inert gas continues to flow. The film is given negative bias of about 100–200 volts, and the sputtering is allowed to proceed for as long as desired.

An important feature of the above described procedure is that when reactive gas is switched off in a typical sputtering system about 30 minutes are required before the inert gas is really pure again. Without the application of a negative bias described herein during the subsequent sputtering operation a very impure film would be obtained. Similarly, one-half percent of a reactive gas is generally insufficient to cause sufficient oxidation of the metal film to improve its adhesion under the normal circumstances. However, with the application of the small positive bias the degree of oxidation is sufficient.

The process of the invention may be used with any materials which may be reactively sputtered, for example, metals, alloys and metalloids, such as silicon. As described in a well recognized authority, L. Holland, Vacuum Deposition of Thin Films, John Wiley & Sons, New York, 1956, many metals have been relatively sputtered without difficulty. Using oxygen as a reactive gas, the following metals have been reactively sputtered: Cd, Sn, Zn, Cu, W, Tl, In, Te, Bi, Be, Sb, Ni, Mo, Cr, Th, Ti, Fe, Ta, Ce and Mn.

The materials which are useful in the carrying out of the process of the present invention possess the inherent characteristics that the metal to metal bond is stronger than the metal to oxygen bond for each material.

The construction and operation of the sputtering apparatus electrode spacing, applied cathode voltage, and chamber pressure are the same for the present process as for conventional sputtering and reactive sputting processes. Among the many prior art sources and references which are useful for determining conventional sputtering parameters is the L. Holland text which is referred to herein.

In a specific example wherein a tantalum layer is to be deposited on a glass substrate, substrate 10 is glass, the cathode 12 is made of tantalum and the inert and reactive gases flowing into the bell jar 13 through conduits 23 and 24 will be argon and oxygen, respectively. The oxygen, however, need not be admitted into the apparatus through a separate and independent conduit. It may be mixed in the desired proportion with the inert gas either before, or after or during the admission of the inert gas into the apparatus through one and the same conduit. Also the reactive gas need not be necessarily oxygen. The choice of a particular reactive gas will depend upon the nature of the substrate or base, and the substance to be deposited on such substrate or base. Thus, for instance, where the substrate contains nitrides, or chlorides, rather than oxides as the instant substrate 10 does, it will be either nitrogen or chlorine that will be admitted into the sputtering atmosphere in place of oxygen in the instant example.

In this particular case, after the proper sputtering atmosphere has been provided by adding about one-half percent oxygen to the argon in the bell jar 13, the glass substrate 10 is given a slight positive bias of about 3 to 5 volts, in respect to the anode.

The glow is initiated by applying a negative voltage of 3,000 to the cathode and sputtering begins. After about 30 seconds to one minute, the oxygen supply is shut off by the manipulation of valve 26 while argon continues to flow through the conduit 23, and thereafter while the cathode 12 is still negatively biased, substrate 10 is given a negative bias of about 100–200 volts, with respect to the anode. And sputtering is continued until a tantalum film of the desired thickness is obtained.

It will be apparent from the above specific example that the important variations from the conventional sputtering of tantalum onto a glass substrate are the positive and negative biasing of the substrate relative to the anode and the temporary provision of oxygen in the sputtering environment.

While the above example has used a reaction between the oxygen and the cationic depositor to form a compatibilizing coating on the substrate, it will be understood the principles of the invention can be used by reacting the electronegative gas with a cationic base, or with both. It will be understood further the principles of the invention are equally applicable to the cationic sputtering of other depositor metals and alloys and metalloids, such as silicon, and the like which often are generically designated as metals.

In another example, the effects of biasing a substrate and leaving a substrate unbiased with respect to an anode were observed, measured and compared for conventional sputtering processes. The sputtering chamber was a conventional 18 x 30 in. glass bell jar system. A cathode with a conventional cooling arrangement was used. There 1 x 3 in. glass substrates were employed; each could be independently biased. The chamber was evacuated to $2\times10^{-6}$ torr, and argon was admitted to the desired pressure. A flow meter system allowed other gasses to be mixed with the argon. The sputtering gas was continuously passed through the system during the tests. As is conventional, the gas pressure was 75 m. torr, the sputtering potential was 2600 v., and the current density was 1.4 ma./cm.$^2$.

Tantalum was sputtered in argon containing 1.8% oxygen. The deposition rate was 8 a./sec. Relatively thick films, approximately 3000 a. were deposited to insure equilibrium between tantalum and impurities for a substantial fraction of the deposition time.

It is well recognized that film resistivity is a measure of impurities; consequently, a plot of film resistivity vs. bias voltage was experimentally obtained to show the effect of bias voltage on film impurities. For low negative bias voltages film resistivity was high, indicating impure films; for bias voltages of about −200 to −300 volts film resistivity was low, about 150 to 100 microhm-cm., indicating pure films.

In another example employing the same apparatus and operating parameters, various amounts of oxygen were used in the sputtering chamber. The results of substrate bias voltage vs. resistivity were determined for residual oxygen, for .25% oxygen, and for .9% oxygen in the chamber. All resistivity measurements were high for low negative bias. Low resistivities of about 100 microhm-cm. were found for biases of about −200 volts. In another example using the identical apparatus and operating parameters cathodes maintained at about 40° C. were compared with uncooled cathodes. Lowest film resistivity, highest purity was experienced at about a −200 volts bias when operating with the hot cathode. Film resistivity was uniformly low over a bias range of −100 to −300 when using the cooled cathode indicating the production of a pure film.

In still another example a test was made to consider possible effects of cathode impurities. Using the above described conventional apparatus and operating parameters and allowing cathodes to float thermally, films were sputtered from two different cathodes which previously had been observed over an extended period of time to give films of consistently different resistivities. At low negative bias voltages, less than −100 volts, films, resistivities were high, with higher values experienced for the cathode with a history of producing higher resistivity films. For bias voltages of −100 to −200 volts uniformly low resistivities were measured in films produced by both cathodes, indicating that both cathodes deposit pure films when the latter are biased negatively at about 100 to 200 volts while the films are being deposited in a sputtering chamber.

Sputtering films to which negative bias was applied for the full deposition time were largely prevented from forming an oxide bond and, consequently, tended to suffer poor adhesion. To create intermediate oxide layers necessary for good adhesion, substrates on which films were to be sputtered under negative bias were initially given a small positive bias of about 5 volts. The small positive bias enhanced the sticking probability of any negative ions in the glow and caused the initial deposition of an impure film. Advantage was noted when about ½% to 1% of oxygen was admitted with the argon while the positive bias was being applied. After about 30 seconds the bias was switched over to the desired negative value, and only pure argon was admitted.

In further examples using conventional sputtering apparatus and operating parameter as above described similar results have been obtained for all other metals investigated such as niobium, molybdenum and tungsten.

The examples have confirmed that a film of high purity may be obtained by negatively biasing a substrate in a range of about 100 to 200 volts with respect to an anode.

For example, in a conventional sputtering system a negative voltage of 3,000 volts is applied to a cathode. Niobium is sputtered from the cathode onto a substrate which is positively biased at about 4 volts with respect to the anode. The sputtering chamber is continuously supplied with an inert gas and about ¾% oxygen at a total pressure of about 50 microns. After 30 seconds the oxygen supply is shut off, and the substrate which is an oxide, for example glass, is biased with a negative 150 volts with respect to the anode. Sputtering is continued until a layer of desired thickness is obtained. A product results with a thin layer of pure niobium on top of a very thin layer of a combined form of niobium and oxygen. The layers are well bonded to each other and to the substrate.

The same process is repeated using nitrogen in place of oxygen and a silicon nitride substrate in place of the glass substrate in the sputtering chamber.

Product results which is a pure thin layer of niobium overlying a very thin layer of a combined form of niobium and nitrogen.

In another example, in a conventional sputtering system a negative voltage of 3,000 volts is applied to a cathode. Molybdenum is sputtered from the cathode onto a substrate which is positively biased at about 4 volts with respect to the anode. The sputtering chamber is continuously supplied with an inert gas and about ¾% oxygen at a total pressure of about 50 microns. After 30 seconds the oxygen supply is shut off, and the substrate is biased with a negative 150 volts with respect to the anode. Sputtering is continued until a layer of desired thickness is obtained. A product results with a thin layer of pure molybdenum on top of a very thin layer of a combined form of molybdenum and oxygen. The layers are well bonded to each other and to the substrate.

The same process is repeated with molybdenum, using nitrogen in place of oxygen in the sputtering chamber. A product results which is a pure thin layer of molybdenum overlying a very thin layer of a combined form of molybdenum and nitrogen.

For another example, in a conventional sputtering system a negative voltage of 3,000 volts is applied to a cathode. Tungsten is sputtered from the cathode onto glass substrate which is positively biased at about 4 volts with respect to the anode. The sputtering chamber is continuously supplied with an inert gas and about ¾% oxygen at a total pressure of about 50 microns. After 30 seconds the oxygen supply is shut off and the substrate is biased with a negative 150 volts with respect to the anode. Sputtering is continued until a layer of desired thickness is obtained. A product results with a thin layer of pure tungsten on top of a very thin layer of a combined form of tungsten and oxygen. The layers are well bonded to each other and to the substrate.

The same tungsten sputtering process is repeated using nitrogen in place of oxygen and using a nitride substrate for example, silicon nitride, in the sputtering chamber. A product results which is a pure thin layer of tungsten overlying a very thin layer of a combined form of tungsten and nitrogen.

For example, in a conventional sputtering system a negative voltage of 3,000 volts is applied to a cathode. Antimony is sputtered from the cathode onto a glass substrate which is positively biased at about 4 volts with respect to the anode. The sputtering chamber is continuously supplied with an inert gas and about ¾% oxygen at a total pressure of about 50 microns. After 30 seconds the oxygen supply is shut off, and the substrate is biased with a negative 150 volts with respect to the anode. Sputtering is continued until a layer of desired thickness is obtained. A product results with a thin layer of pure antimony on top of a very thin layer of a combined form of antimony and oxygen. The layers are well bonded to each other and to the substrate.

The same antimony sputtering process is repeated using a silicon nitride substrate and using nitrogen in place of oxygen in the sputtering chamber. A product results which is a pure thin layer of antimony overlying a very thin layer of a combined form of antimony and nitrogen.

In another example, in a conventional sputtering system a negative voltage of 3,000 volts is applied to a cathode. Iron is sputtered from the cathode onto a silica glass substrate which is positively biased at about 4 volts with respect to the anode. The sputtering chamber is continuously supplied with an inert gas and about ¾% oxygen at a total pressure of about 50 microns. After 30 seconds the oxygen supply is shut off, and the substrate is biased with a negative 150 volts with respect to the anode. Sputtering is continued until film of desired thickness is obtained. A product results with a thin layer of pure iron on top of a very thin layer of a combined form of iron and oxygen. The layers are well bonded to each other and to the substrate.

The same process is repeated with iron, using a silicon nitride substrate and using nitrogen in place of oxygen in the sputtering chamber. A product results which is a pure thin layer of iron overlying a very thin layer of a combined form of iron and nitrogen.

For another example, in a conventional sputtering system a negative voltage of 3,000 volts is applied to a cathode. Zinc is sputtered from the cathode onto a silica glass substrate which is positively biased at about 4 volts with respect to the anode. The sputtering chamber is continuously supplied with an inert gas and about ¾% oxygen at a total pressure of about 50 microns. After 30 seconds the oxygen supply is shut off, and the substrate is biased with a negative 150 volts with respect to the anode. Sputtering is continued until a layer of desired thickness is obtained. A product results with a thin layer of pure zinc on top of a very thin layer of a combined form of zinc and oxygen. The layers are well bonded to each other and to the substrate.

The same zinc sputtering process is repeated using a silicon nitride substrate and using nitrogen in place of oxygen in the sputtering chamber. A product results which is a pure thin layer of zinc overlying a very thin layer of a combined form of zinc and nitrogen.

In another example, in a conventional sputtering system a negative voltage of 3,000 volts is applied to a cathode. Copper is sputtered from the cathode onto a silica glass substrate which is positively biased at about 4 volts with respect to the anode. The sputtering chamber is continuously supplied with an inert gas and about ¾% oxygen at a total pressure of about 50 microns. After 30 seconds the oxygen supply is shut off, and the substrate is biased with a negative 150 volts with respect to the anode. Sputtering is continued until film of desired thickness is obtained. A product results with a thin layer of pure copper on top of a very thin layer of a combined form of copper and oxygen. The layers are well bonded to each other and to the substrate.

The same copper sputtering process is repeated employing a silicon nitride substrate and using nitrogen in place of oxygen in the sputtering chamber. A product results which is a pure thin layer of copper overlying a very thin layer of a combined form of copper and nitrogen.

For another example, in a conventional sputtering system a negative voltage of 3,000 volts is applied to a cathode. Thorium is sputtered from the cathode onto a silica glass substrate which is positively biased at about 4 volts with respect to the anode. The sputtering chamber is continuously supplied with an inert gas and about ¾% oxygen at a total pressure of about 50 microns. After 30 seconds the oxygen supply is shut off, and the substrate is biased with a negative 150 volts with respect to the anode. Sputtering is continued until a layer of desired thickness is obtained. A product results with a thin layer of pure thorium on top of a very thin layer of a combined form of thorium and oxygen. The layers are well bonded to each other and to the substrate.

The same thorium sputtering process is repeated using a silicon nitride substrate and using nitrogen in place of oxygen in the sputtering chamber. A product results which is a pure thin layer of thorium overlying a very thin layer of a combined form of thorium and nitrogen.

In another example, in a conventional sputtering system a negative voltage of 3,000 volts is applied to a cathode. Nickel is sputtered from the cathode onto a silica glass substrate which is postively biased at about 4 volts with respect to the anode. The sputtering chamber is continuously supplied with an inert gas and about ¾% oxygen at a total pressure of about 50 microns. After 30 seconds the oxygen supply is shut off, and the substrate is biased with a negative 150 volts with respect to the anode. Sputtering is continued until a layer of desired thickness is obtained. A product results with a thin layer of pure nickel on top of a very thin layer of a combined form of nickel and oxygen. The layers are well bonded to each other and to the substrate.

In other examples, in conventional sputtering systems negative voltages of 3,000 volts are applied to cathodes. Indium, tellurium, bismuth, chromium, titanium, tantalum, beryllium, cerium and manganese individually are sputtered from cathodes onto silica glass substrates which are positively biased at about 4 volts with respect to the anodes in individual sputtering chambers. The sputtering chambers are continuously supplied with inert gas and about ¾% oxygen at pressures of about 50 microns. After 30 seconds the oxygen supplies are shut off, and the substrates are biased with a negative 150 volts with respect to the anodes. Sputtering is continued until layers of desired thickness are obtained. Products result with thin layers of pure sputtered metal respectively on top of very thin layers of combined forms of sputtered metal and oxygen. The layers are well bonded to each other and to the substrates.

The same processes are repeated, using silicon nitride substrates, employing nitrogen in place of oxygen in the sputtering chambers and utilizing cathodes of beryllium, chromium and titanium, respectively. Products result which are pure thin layers of sputtered metal overlying very thin layers of combined forms of individually sputtered metal and nitrogen.

Any reactively sputterable metal or material which is susceptable to resputtering may be employed in combination with an inert and reactive gas in the process of this invention. The examples show that a sputtered material layer of high purity may be obtained by negatively biasing a substrate in a range of about 100 to 200 volts with respect to an anode, while sputtering metal from a cathode in the presence of gas which, in the absence of the high negative bias, would contaminate the sputtered film, and that adhesion of the film of high purity is enhanced by the initial applying of a small positive bias on the substrate and by the concurrent initial admitting of about 1% oxygen to the sputtering chamber.

The process of the invention is applicable to all reactively sputterable materials and reactive gases which deposit a film the purity of which may be assured by the negative biasing of substrates in the range of about 100 to 200 volts. The highly desirable characteristics of the substrate coatings are best attainable by employing both of the important positive and negative biasing steps of the process.

Wehner U.S. Pat. 3,021,271 exemplified the most recent developments in the art to which this invention appertains. In that patent a sputtering method is disclosed in which the substrate is maintained more negative than the anode of the sputtering apparatus in order to grow solid layers on a crystallographically compatible substrate with a continuance of the crystal orientation in the formed layer. More particularly, the disclosure of that patent relates to the growth by sputtering of crystal layers on seed crystals with a continuation of the crystal orientation of the seed crystal. In the method of that invention, the substrate and depositor are both subjected to a preliminary ionic bombardment in order to remove contaminating materials therefrom before creating conditions conducive to sputtering. It will be seen such a process is concerned with the removal of contaminating materials from a crystal substrate and the subsequent deposition, by sputtering, of a crystallographically compatible crystalline material on the crystalline substrate. On the other hand the present invention is importantly concerned with the growth by sputtering of a strongly adhesive and substantially uncontaminated layers of solid material upon crystallographically incompatible substrates by first forming a compatibilizing coating on the substrate.

While the invention has been particularly shown and described with reference to a preferred embodiment thereof, it will be understood by those skilled in the art that various changs in form and details may be made therein without departing from the spirit and scope of the invention.

What is claimed is:

1. In a cathodic sputtering process employing a sputtering chamber, a depositor of reactively sputterable metal having a metal to metal bond strength greater than a metal to oxygen bond strength, a substrate, and an anode, for coating a surface of the substrate, the improvement comprising:

positioning the substrate, in the chamber and electrically isolating the substrate from the anode,
evacuating the chamber,
admitting an inert gas to the chamber in an amount sufficient to support sputtering under the conditions of applied voltage,
admitting oxygen to the chamber in an amount about ½% of the amount of the inert gas, continuously applying a sputtering potential in a strength sufficient to support a glow discharge and to support sputtering at the chamber pressure, thereby ionizing gas in the chamber and sputtering the reactively sputterable metal from the depositor to the surface of the substrate,
initially providing on the substrate a positive bias of about 3 to 5 volts with respect to the anode, thereby forming on the substrate a first coating of the sputterable material and oxygen,
continuing the providing of a positive bias on the substrate and the admitting of the oxygen for about 30 seconds,
discontinuing the admitting of the oxygen to the chamber,
discontinuing the providing of the positive bias on the substrate, and promptly,
establishing a negative bias of about 100 to 200 volts on the substrate with respect to the anode, thereby continuing a coating process and providing a second relatively pure coating of the reactively sputterable metal from the depositor.

2. The improved cathodic sputtering process of claim 1 wherein the metal is tantalum.

References Cited

UNITED STATES PATENTS

| | | | |
|---|---|---|---|
| 2,305,758 | 12/1942 | Berghaus et al. | 204—192 |
| 3,021,271 | 2/1962 | Wehner | 204—192 |
| 3,077,444 | 2/1963 | Hoh | 204—192 |
| 3,287,243 | 3/1967 | Ligenza | 204—192 |
| 3,307,983 | 3/1967 | De Haan et al. | 204—164 |
| 3,324,019 | 6/1967 | Laegreid et al. | 204—298 |
| 3,336,211 | 8/1967 | Mayer | 204—192 |

FOREIGN PATENTS

| | | |
|---|---|---|
| 939,275 | 10/1963 | Great Britain. |

OTHER REFERENCES

A.P.C. application of Berghaus et al., Ser. No. 283,312, published May 18, 1943.

Stuart et al., J. of Applied Physics, vol. 33, No. 7, July 1962, pp. 2345–2352.

Holland, Vacuum Deposition of Thin Films, Chapman and Hall Ltd., 1956, p. 101.

Miles et al., J. of the Electrochemical Society, vol. 110, Nos. 3 and 12, pp. 58c and 1240–5 respectively.

ROBERT K. MIHALEK, Primary Examiner

U.S. Cl. X.R.

204—298